United States Patent
Cohen et al.

(10) Patent No.: US 6,573,324 B1
(45) Date of Patent: Jun. 3, 2003

(54) TIRE WITH COMPONENT COMPRISED OF RUBBER COMPOSITION CONTAINING PRE-HYDROPHOBATED SILICA AGGREGATES

(75) Inventors: Martin Paul Cohen, Fairlawn, OH (US); Richard Robinson Smith, Cuyahoga Falls, OH (US); Fredrick Lewis Magnus, Mogadore, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/542,571

(22) Filed: Apr. 4, 2000

(51) Int. Cl.$^7$ .................................................. C08K 3/34
(52) U.S. Cl. ........................ 524/492; 524/493; 524/495
(58) Field of Search ................................. 524/492, 493, 524/495

(56) References Cited

U.S. PATENT DOCUMENTS

| 4,474,908 A | 10/1984 | Wagner ...................... 523/213 |
| 5,094,829 A | 3/1992 | Krivak et al. ................ 423/339 |
| 5,708,069 A | 1/1998 | Burns et al. ................. 524/403 |
| 5,750,610 A | 5/1998 | Burns et al. ................. 524/434 |
| 5,780,538 A | 7/1998 | Cohen et al. ................ 524/494 |
| 5,789,514 A | 8/1998 | Burns et al. ................. 528/12 |

FOREIGN PATENT DOCUMENTS

EP 0744437 4/1996 ............ C08K/5/54

OTHER PUBLICATIONS

*Encyclopedia of Chemical Technology*, Fourth Edition (1997), vol. 21, Kirk–Othmer, pp. 1020 through 1026.
European Search Report.

*Primary Examiner*—Edward J. Cain
(74) *Attorney, Agent, or Firm*—Henry C. Young, Jr.

(57) ABSTRACT

The invention relates to a tire having at least one component comprised of a rubber composition which contains pre-hydrophobated precipitated silica aggregates. Such tire component may be, for example although not limited to, a tire tread, sidewalls and/or sidewall insert. Such pre-hydrophobated precipitated silica aggregates are contemplated as being prepared, for example, by treatment of a colloidal silica with a combination of both an organomercaptosilane and an alkylsilane.

20 Claims, No Drawings

TIRE WITH COMPONENT COMPRISED OF RUBBER COMPOSITION CONTAINING PRE-HYDROPHOBATED SILICA AGGREGATES

FIELD

The invention relates to a tire having at least one component comprised of a rubber composition which contains pre-hydrophobated precipitated silica aggregates. Such tire component may be, for example although not limited to, a tire tread, sidewall and/or sidewall insert. Such pre-hydrophobated precipitated silica aggregates are contemplated as being prepared, for example, by treatment of a colloidal silica with a combination of both an organomercaptosilane and an alkylsilane.

BACKGROUND OF THE INVENTION

Tires may be prepared with a rubber component which contains a precipitated silica which is hydrophobated in situ within the elastomer host by addition of both an, organomercaptosilane and an alkyl silane. For example, see U.S. Pat. No. 4,474,908.

Tires may also be prepared with a rubber component in which both an organosilyl polysulfide and an alkylsilane are individually added to a silica-containing rubber composition to treat the amorphous silica in-situ within the rubber host with both (1) a hydrophobating agent (the alkylsilane) and (2) a silica coupler (the organosilyl polysulfide compound). For example, see U.S. Pat. No. 5,780,538.

In practice, it is recognized that precipitated silica aggregates are typically hydrophilic (water attracting) in nature and, in order to aid in dispersing the silica aggregates in various rubber compositions, it is sometimes desired to make the silica aggregates more hydrophobic (water repelling) in nature and therefore more compatible with the rubber. Accordingly, and as described in the aforesaid U.S. Pat. Nos. 4,474,908 and 5,780,538, a hydrophobating agent may be added to a rubber composition in addition to the precipitated silica to combine with the silica in-situ within the rubber host to make the silica more hydrophobic in nature.

However, it is considered herein, for tire tread applications where enhanced properties such as, for abrasion resistance, are often sought, and particularly where a good homogeneous dispersion in the rubber host is often sought, that an in-situ modification of the amorphous silica within a viscous rubber host on a hit and miss basis, under relatively harsh high sheer and high temperature conditions is a relatively inefficient procedure of modifying the amorphous silica for use in rubber compositions which are intended to be silica reinforced, particularly where both an organosilane and alkyl silane are used which would compete within the rubber composition for reaction sites on the silica surface.

Accordingly, it is proposed herein to provide a tire having a component comprised of a rubber composition which contains particulate pre-hydrophobated precipitated silica aggregates where the silica aggregates are added to, or mixed with, the rubber composition in a pre-hydrophobated form instead of more inefficiently subsequently hydrophobating the silica aggregates in situ within the elastomer host.

Historically, according to U.S. Pat. Nos. 5,708,069 and 5,789,514 a silica gel may be derived by hydrophobating a silica hydrogel with both an organomercaptosilane and alkyl silane and drying the product. The resulting hydrophobated silica gel may be blended with natural rubber and/or synthetic rubber. This invention is intended to be exclusive of recovered silica gels and is intended to be limited to precipitated silica aggregates.

Also, historically, according to U.S. Pat. No. 5,750,610, an organosilicatemodified silica gel may be hydrophobated with both an organomercaptosilane and alkyl silane and the dried treated organosilicate-modified silica gel blended with natural rubber and/or synthetic rubber. This invention is intended to be exclusive of such modified silica gels.

A general description of silica gel and precipitated silica may be found, for example, in the *Encyclopedia of Chemical Technology*, Fourth Edition (1997), Volume 21, Kirk-Othmer, silica gel is described in Pages 1020 through 1023 as a ". . . coherent, rigid, continuous three-dimensional network of spherical particles of colloidal silica." Precipitated silica is described on pages 1023 through 1026 as being ". . . composed of aggregates (or secondary particles) of ultimate (or primary) particles of colloidal-size silica that have not become linked in a massive gel network during the preparation process." "Particulate silica powders have a more open structure with higher pore volume than do dried pulverized gels . . . ".

The pre-hydrophobated precipitated silica aggregates for this invention are intended to be exclusive of silica gels of a three dimensional network of spherical particles as referenced in the above Encyclopedia of Chemical Technology.

A further descriptive discussion of silica gels and precipitated silicas may be found, for example, in U.S. Pat. No. 5,094,829 which, as such reference, is intended to be incorporated here in its entirety.

The proposal for this invention for a tire with a component of a rubber composition which contains pre-hydrophobated precipitated silica aggregates of elementary silica particles instead of precipitated silica aggregates which are hydrophobated in situ within the elastomer host with individually added hydrophobating compounds, by treatment of a colloidal silica by both an organomercaptosilane and an alkylsilane, is considered herein to be novel and a departure from past practice.

In the description of this invention, the term "phr" relates to parts by weight for a material or ingredient per 100 parts by weight elastomer(s)". The terms "rubber" and "elastomer" are used interchangeably unless otherwise indicated. The terms "cure" and "vulcanize" are used interchangeably unless otherwise indicated.

SUMMARY AND PRACTICE OF THE INVENTION

In accordance with this invention, a tire is provided which contains at least one component comprised of a rubber composition comprised of, based on 100 parts by weight (phr) of diene-based elastomer, (A) 100 phr of at least one hydrocarbon conjugated diene-based elastomer,
(B) about 10 to about 120, alternately about 40 to about 100, phr of reinforcing filler comprised of
  (i) particulate, pre-hydrophobated precipitated silica aggregates, and optionally
  (ii) about 2 to about 100, alternately about 2 to about 50, phr of at least one additional reinforcing filler selected from at least one of carbon black and an additional synthetic amorphous silica, wherein said pre-hydrophobated precipitated silica aggregates are pre-hydrophobated by treating silica in anaqueous colloidal form thereof with both an organomercaptosilane and an alkylsilane in a weight ratio of said organomercaptosilane to said alkylsilane in a range of from 10/90 to 90/10;

wherein said alkylsilane is of the general Formula (I)

$$X_n\text{—}Si\text{—}R_{4-n} \qquad (I)$$

wherein R is an alkyl radical having from one to 18, preferably from one to 8, carbon atoms such as, for example, methyl, ethyl, isopropyl, n-butyl and octadecyl radicals, n is a value of from 1 to 3 and X is a radical selected from halogen, namely chlorine or bromine, preferably a chlorine radical, and alkoxy radicals, preferably an alkoxy radical as $(R^1O)$—, wherein $R^1$ is an alkyl radical having from one to 3 carbon atoms such as, for example, methyl, ethyl and isopropyl radicals, preferably from methyl and ethyl radicals, and where said organomercaptosilane is of the general formula (II):

$$(X)_n(R^2O)_{3-n}\text{—}Si\text{—}R^3\text{—}SH \qquad (II)$$

wherein X is a radical selected from halogen, namely chlorine or bromine, preferably a chlorine radical, and alkyl radicals having from one to 16, preferably from one to 4, carbon atoms, preferably selected from methyl, ethyl, n-propyl and n-butyl radicals; wherein $R^2$ is an alkyl radical having from one to 16, preferably from one to 4 carbon atoms, preferably selected from methyl and ethyl radicals and $R^3$ is an alkylene radical having from one to 16, preferably from one to 4, carbon atoms, preferably a propylene radical; n is a value from zero to 3, preferably zero.

The hydrophobated precipitated silica aggregates might be recovered, for example, from said treated colloidal silica, for example as a treated silica hydrosol, with the aid of acid addition to the treated colloidal silica (for example, sulfuric acid or hydrochloric acid) followed by water washing and drying the recovered hydrophobated silica as a hydrophobated silica gel or as a hydrophobated precipitated silica. While this invention is not intended to be directed to a specific preparation technique (preparation of silica hydrosols, recovery of silica gels and precipitated silicas, etc.) of the pre-hydrophobated precipitated silica itself, for education purposes in this regard, reference might be made to the aforesaid *Condensed Chemical Dictionary* and U.S. Pat. No. 5,094,829 as well as U.S. Pat. Nos. 5,708,069, 5,789,514 and 5,750,610 for a more detailed discussion.

Representative alkylsilanes of Formula (I) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Representative organomercaptosilanes of Formula (II) are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

In further accordance with this invention, a tire of this invention is provided with said component which may be, for example, a tire tread such as for example a tread, tread cap and/or tread base; tire sidewall; tire carcass component such as for example a carcass cord ply coat; tire sidewall stiffening insert; an apex adjacent to or spaced apart from a tire bead; tire chafer; and tire bead component.

Significantly, by the practice of this invention, an addition of a coupling agent to the rubber composition for an in-situ interaction is not considered herein as being necessary for the hydrophobated silica to effectively reinforce the rubber composition because the pre-hydrophobated precipitated silica aggregates contain an integral coupling agent, namely the organomercaptosilane derived moiety.

In the practice of this invention, the various components of the tire may be a rubber composition comprised of various conjugated diene based elastomers. Such diene-based elastomers may be polymers and copolymers of conjugated dienes, such as, for example, isoprene and 1,3-butadiene, and copolymers of at least one conjugated diene hydrocarbon and vinyl aromatic compound selected from styrene and alphamethyl styrene, preferably styrene.

For example, representative of such elastomers are cis 1,4-polyisoprene rubber (natural and synthetic), cis 1,4-polybutadiene rubber, high vinyl polybutadiene rubber having a vinyl 1,2 content in a range of about 10 percent to about 90 percent, styrene/butadiene copolymer (SBR) rubber (aqueous emulsion or organic solution polymerization prepared copolymers) and including organic solvent polymerization prepared SBR having a vinyl 1,2-content in a range of about 10 to about 90 percent based on its polybutadiene derived portion and a polystyrene content in a range of about 10 to about 60 percent based upon the copolymer, styrene/isoprene/butadiene terpolymer rubber, butadiene/acrylonitrile rubber, styrene/isoprene copolymer and isoprene/butadiene copolymer rubber, 3,4-polyisoprene rubber and trans 1,4-polybutadiene rubber.

Organic solvent polymerization prepared tin coupled elastomers such as for example, tin coupled styrene/butadiene copolymers may also be used.

Tin coupled copolymers of styrene/butadiene may be prepared, for example, by introducing a tin coupling agent during the styrene/1,3-butadiene monomer copolymerization reaction in an organic solvent solution, usually at or near the end of the polymerization reaction. Such coupling of styrene/butadiene copolymers is well known to those having skill in such art.

In practice, it is usually preferred that at least 50 percent and more generally in a range of about 60 to about 85 percent of the Sn (tin) bonds in the tin coupled elastomeres are bonded to butadiene units of the styrene/butadiene copolymer to create Sn-dienyl bonds such as butadienyl bonds.

Creation of tin-dienyl bonds can be accomplished in a number of ways such as, for example, sequential addition of butadiene to the copolymerization system or use of modifiers to alter the styrene and/or butadiene reactivity ratios for the copolymerization. It is believed that such techniques, whether used with a batch or a continuous copolymerization system, is well know to those having skill in such art.

Various tin compounds, particularly organo tin compounds, may be used for the coupling of the elastomer. Representative of such compounds are, for example, alkyl tin trichloride, dialkyl tin dichloride, yielding variants of a tin coupled styrene/butadiene copolymer elastomer, although a trialkyl tin monochloride might be used which would yield simply a tin-terminated copolymer.

Examples of tin-modified, or coupled, styrene/butadiene copolymer elastomers might be found, for example, in U.S. Pat. No. 5,064,901.

Various commercially available silicas may also be added to the rubber composition together with the said treated silica for the reinforcement of the diene based elastomers. Such silicas are typically characterized by the aforesaid BET and CTAB surface areas. Representative of such silicas, for example, only and without limitation, are silicas available from PPG Industries under the Hi-Sil trademark with designations 210, 243, etc; silicas available from Rhodia, with designations of Zeosil 1165MP and Zeosil 165GR, silicas available from Degussa AG with designations VN2 and VN3, and silicas available from Huber as Zeopol 8745 and Zeopol 8715.

It is contemplated herein that a coupling agent be used in conjunction with such additional silica for rubber composition.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The presence and relative amounts of the above additives are not considered to be an aspect of the present invention, unless otherwise indicated, which is more primarily directed to a tire with a component of a rubber composition which contains the described particulate, pre-hydrophobated precipitated silica aggregates.

The tires can be built, shaped, molded and cured by various methods which will be readily apparent to those having skill in such art.

While certain representative embodiments and details have been shown for the purpose of illustrating the invention, it will be apparent to those skilled in this art that various changes and modifications may be made therein without departing from the spirit or scope of the invention.

What is claim is:

1. A tire which contains at least one component comprised of a rubber composition comprised of, based on 100 parts by weight (phr) of diene-based elastomer,
    (A) 100 phr of at least one hydrocarbon conjugated diene-based elastomer,
    (B) about 10 to about 120 phr of reinforcing filler comprised of
        (i) particulate, pre-hydrophobated precipitated silica aggregates, and optionally
        (ii) about 2 to about 100 phr of additional reinforcing filler selected from at least one of carbon black and additional synthetic amorphous silica,
    wherein said pre-hydrophobated precipitated silica is formed by treating silica in an aqueous colloidal form thereof with both an organomercaptosilane and an alkylsilane in a weight ratio of said organomercaptosilane to said alkylsilane in a range of from 10/90 to 90/10;
    wherein said alkylsilane is of the general Formula (I)

wherein R is an alkyl radical having from one to 18 carbon atoms, n is a value of from 1 to 3 and X is a radical selected from chlorine, bromine, and alkoxy radicals as $(R^1O)$—, wherein $R^1$ is an alkyl radical having from one to 3 carbon atoms, and
    wherein said organomercaptosilane is of the general formula (II):

wherein X is a radical selected from chlorine, bromine, and alkyl radicals having from one to 16 carbon atoms; wherein $R^2$ is an alkyl radical having from one to 16 carbon atoms $R^3$ is an alkylene radical having from one to 16 carbon atoms and n is a value from zero to 3, and
    wherein said rubber composition contains a coupling agent for said additional synthetic amorphous silica reinforcement filler.

2. The tire of claim 1 wherein said rubber composition is exclusive of any additive selected from alkyl silane, alkoxysilane and bis(trialkoxysilylalkyl)polysulfide compounds other than said pre-hydrophobated silica.

3. The tire of claim 1 wherein said alkylsilanes of Formula (I) are selected from at least one of trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

4. The tire of claim 1 wherein said organomercaptosilanes of Formula (II) are selected from at least one of triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

5. The tire of claim 2 wherein said organomercaptosilanes of Formula (II) are selected from at least one of triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

6. The tire of claim 4 wherein said organomercaptosilanes of Formula (II) are selected from at least one of triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

7. The tire of claim 1 wherein, for said rubber composition, said reinforcing filler is said pre-hydrophobated precipitated silica aggregate and carbon black and is exclusive of any additional synthetic amorphous silica reinforcement filler.

8. The tire of claim 1 wherein, for said rubber composition, said reinforcing filler is said pre-hydrophobated precipitated silica aggregate, carbon black and additional synthetic amorphous silica reinforcement filler.

9. The tire of claim 1 wherein said additional synthetic amorphous silica is a precipitated silica and said coupling agent therefore is a bis(trialkoxysilylalkyl) polysulfide.

10. The tire of claim 1 wherein said diene-based elastomer is selected from at least one of polymers and copolymers of conjugated dienes copolymers of at least one conjugated diene hydrocarbon and vinyl aromatic compound selected from styrene and alphamethyl styrene.

11. The tire of claim 10 wherein said conjugated diene is selected from at least one of isoprene and 1,3-butadiene and said vinyl aromatic compound is styrene.

12. The tire of claim 1 wherein said diene-based elastomer is selected from at least one of cis 1,4-polyisoprene rubber (natural and synthetic), cis 1,4-polybutadiene rubber, high vinyl polybutadiene rubber having a vinyl 1,2-content in a range of about 10 percent to about 90 percent, styrene/butadiene copolymer (SBR) rubber (aqueous emulsion or organic solution polymerization prepared copolymers) and including organic solvent polymerization prepared SBR having a vinyl 1,2-content in a range of about 10 to about 90 percent based on its polybutadiene derived portion and a polystyrene content in a range of about 10 to about 60 percent based upon the copolymer, styrene/isoprene/butadiene terpolymer rubber, butadiene/acrylonitrile rubber, styrene/isoprene copolymer rubber, isoprene/butadiene copolymer rubber, 3,4-polyisoprene rubber and trans 1,4-polybutadiene rubber.

13. The tire of claim 11 wherein at least one of said elastomers is an organic solvent polymerization prepared tin coupled elastomer.

14. The tire of claim 1 wherein said tire component is selected from at least one of a tire tread, tire tread cap, tire tread base, tire sidewall, carcass cord ply coat, tire sidewall stiffening insert, tire apex adjacent to a tire bead, tire apex spaced apart from tire bead, tire chafer, and tire bead component.

15. The tire of claim 2 wherein said tire component is selected from at one of a tire tread, tire tread cap, tire tread base, tire sidewall, carcass cord ply coat, tire all stiffening insert, tire apex adjacent to a tire bead, tire apex spaced apart from tire bead, tire chafer, and tire bead component.

16. The tire of claim 1 wherein said tire component is a tire tread, tire tread cap and/or tire tread base.

17. The tire of claim 2 wherein said tire component is a tire tread, tire tread cap and/or tire tread base.

18. The tire of claim 7 wherein said tire component is a tire tread.

19. The tire of claim 8 wherein said tire component is a tire tread.

20. The tire of claim 9 wherein said tire component is a tire tread.

* * * * *